(12) United States Patent
Vakalapudi

(10) Patent No.: US 10,956,467 B1
(45) Date of Patent: Mar. 23, 2021

(54) METHOD AND SYSTEM FOR IMPLEMENTING A QUERY TOOL FOR UNSTRUCTURED DATA FILES

(71) Applicant: JPMorgan Chase Bank, N.A., New York, NY (US)

(72) Inventor: Suneetha Vakalapudi, Garnet Valley, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 681 days.

(21) Appl. No.: 15/681,905

(22) Filed: Aug. 21, 2017

Related U.S. Application Data

(60) Provisional application No. 62/377,971, filed on Aug. 22, 2016.

(51) Int. Cl.
*G06F 16/00* (2019.01)
*G06F 16/33* (2019.01)
*G06F 16/34* (2019.01)
*G06F 16/338* (2019.01)

(52) U.S. Cl.
CPC .......... *G06F 16/334* (2019.01); *G06F 16/338* (2019.01); *G06F 16/34* (2019.01)

(58) Field of Classification Search
CPC .......... G06F 16/30; G06F 16/33; G06F 16/34; G06F 16/332; G06F 16/334; G06F 16/338; G06F 16/3322; G06F 16/3323; G06F 16/3325; G06F 16/3326; G06F 16/3328; G06F 16/3331
USPC ....................................................... 707/722
See application file for complete search history.

(56) References Cited

U.S. PATENT DOCUMENTS

| | | | | |
|---|---|---|---|---|
| 7,448,022 B1* | 11/2008 | Ram | ................. | G06F 8/00 717/120 |
| 7,941,459 B1* | 5/2011 | Erickson | ............. | G06F 11/1469 707/803 |
| 9,477,731 B2* | 10/2016 | Kornacker | ............ | G06F 16/284 |
| 9,552,412 B1* | 1/2017 | Lowe | ............... | G06F 16/93 |
| 10,089,676 B1* | 10/2018 | Gupta | ............... | G06Q 30/0633 |
| 10,185,708 B2* | 1/2019 | Miller | ............... | G06F 16/2372 |
| 10,360,394 B2* | 7/2019 | Arasan | ............... | G06F 21/604 |
| 10,372,915 B2* | 8/2019 | Inagaki | ................ | G06F 21/577 |
| 10,635,718 B1* | 4/2020 | Shandilya | ............. | G06F 16/23 |
| 10,706,377 B2* | 7/2020 | Harris | ............... | G06Q 10/0633 |
| 10,719,799 B1* | 7/2020 | Harris | ............. | G06Q 10/06311 |
| 2002/0042790 A1* | 4/2002 | Nagahara | ............. | G06F 16/957 707/999.004 |

(Continued)

*Primary Examiner* — Ashish Thomas
*Assistant Examiner* — Rezwanul Mahmood
(74) *Attorney, Agent, or Firm* — Hunton Andrews Kurth LLP

(57) ABSTRACT

The invention relates to a query tool for accessing data from an unstructured data source. According to an embodiment of the present invention, the query tool comprises a computer server comprising at least one processor configured to perform: read data from one or more unstructured data sources; initiate one or more registration processes that identifies a file layout for the data; generate a table structure, using the file layout; receive a query request, via the interactive user interface; graphically represent the query request in a graph to facilitate data access; automatically process the query request based on the graph to generate a query result based on the table structure; and transmit the query result to the interactive user interface.

20 Claims, 10 Drawing Sheets

(56) References Cited

U.S. PATENT DOCUMENTS

| | | | |
|---|---|---|---|
| 2002/0062258 A1* | 5/2002 | Bailey | G06F 16/284 705/26.1 |
| 2007/0168335 A1* | 7/2007 | Moore | G06F 16/951 707/999.003 |
| 2009/0132466 A1* | 5/2009 | Etherington | G06F 16/22 707/999.002 |
| 2009/0276771 A1* | 11/2009 | Nickolov | H04L 67/1014 717/177 |
| 2009/0307183 A1* | 12/2009 | Vigen | G06F 16/313 707/999.001 |
| 2011/0320400 A1* | 12/2011 | Namini | G06F 16/21 707/610 |
| 2013/0013648 A1* | 1/2013 | Monjas Llorente | G06F 16/24553 707/803 |
| 2013/0218899 A1* | 8/2013 | Raghavan | G06F 16/156 707/741 |
| 2013/0311454 A1* | 11/2013 | Ezzat | G06F 16/2465 707/722 |
| 2013/0318119 A1* | 11/2013 | Dalal | G06F 13/1652 707/769 |
| 2014/0025626 A1* | 1/2014 | Mefford | G06F 16/2453 707/603 |
| 2014/0046976 A1* | 2/2014 | Zhang | G06Q 10/10 707/772 |
| 2014/0082749 A1* | 3/2014 | Holland | G06F 21/645 726/29 |
| 2014/0181141 A1* | 6/2014 | Sowell | G06F 16/86 707/769 |
| 2014/0279834 A1* | 9/2014 | Tsirogiannis | G06F 16/86 707/602 |
| 2014/0280032 A1* | 9/2014 | Kornacker | G06F 16/2471 707/718 |
| 2014/0324517 A1* | 10/2014 | Harris | G06Q 10/0633 705/7.27 |
| 2014/0330815 A1* | 11/2014 | Bitincka | G06F 16/2455 707/722 |
| 2015/0149879 A1* | 5/2015 | Miller | G06F 16/2477 715/226 |
| 2015/0254330 A1* | 9/2015 | Chan | G06F 16/219 707/613 |
| 2015/0286747 A1* | 10/2015 | Anastasakos | G06F 16/9017 707/776 |
| 2015/0356094 A1* | 12/2015 | Gorelik | G06F 16/211 707/748 |
| 2015/0356123 A1* | 12/2015 | Gorelik | G06F 16/213 715/765 |
| 2015/0379083 A1* | 12/2015 | Lang | G06F 16/24568 707/722 |
| 2016/0041992 A1* | 2/2016 | Miyata | G06F 16/355 707/740 |
| 2016/0103920 A1* | 4/2016 | Lee | G06F 16/2453 707/706 |
| 2016/0125056 A1* | 5/2016 | Knezevic | G06F 16/258 707/722 |
| 2016/0162521 A1* | 6/2016 | Pradhan | G06Q 10/10 707/602 |
| 2016/0224532 A1* | 8/2016 | Miller | G06F 16/22 |
| 2016/0224594 A1* | 8/2016 | Chow | G06F 16/2237 |
| 2016/0253340 A1* | 9/2016 | Barth | G06F 16/122 707/756 |
| 2016/0342643 A1* | 11/2016 | Rowley | H04L 67/22 |
| 2016/0342654 A1* | 11/2016 | Bendel | G06F 16/24542 |
| 2016/0350091 A1* | 12/2016 | Khot | G06F 16/9024 |
| 2016/0373476 A1* | 12/2016 | Dell'Anno | G06F 21/554 |
| 2017/0006135 A1* | 1/2017 | Siebel | G06F 16/283 |
| 2017/0017708 A1* | 1/2017 | Fuchs | G06F 16/288 |
| 2017/0039227 A1* | 2/2017 | Herbst | G06F 16/2272 |
| 2017/0060950 A1* | 3/2017 | Budhiraja | G06F 16/2456 |
| 2017/0091446 A1* | 3/2017 | Bendel | G06F 21/629 |
| 2017/0097970 A1* | 4/2017 | Bendel | G06F 16/252 |
| 2017/0140160 A1* | 5/2017 | Arasan | G06F 16/00 |
| 2017/0148264 A1* | 5/2017 | Pichette | G06Q 20/123 |
| 2017/0155658 A1* | 6/2017 | Mullins | G06F 21/33 |
| 2017/0308535 A1* | 10/2017 | Agarwal | G06F 16/24578 |
| 2017/0329872 A1* | 11/2017 | Dispensa | G06F 16/2471 |
| 2017/0364534 A1* | 12/2017 | Zhang | G06F 16/182 |
| 2018/0032591 A1* | 2/2018 | Priyadarshini | G06Q 30/04 |
| 2018/0157749 A1* | 6/2018 | Statchuk | G06F 16/3322 |
| 2019/0045007 A1* | 2/2019 | Wyatt | G06F 11/008 |
| 2019/0384745 A1* | 12/2019 | Gorelik | G06F 16/217 |

\* cited by examiner

US 10,956,467 B1

METHOD AND SYSTEM FOR IMPLEMENTING A QUERY TOOL FOR UNSTRUCTURED DATA FILES

CROSS REFERENCE TO RELATED APPLICATIONS

The application claims priority to U.S. Provisional Application 62/377,971, filed Aug. 22, 2016, the contents of which are incorporated herein in its entirety.

FIELD OF THE INVENTION

The present invention generally relates to a query tool that reads files from various sources, including unstructured data sources such as Hadoop, adjusts the structure of the files and then provides relevant data to an interface for user interaction.

BACKGROUND OF THE INVENTION

The Hadoop distributed file system (HDFS) is a distributed, scalable, and portable file system written in Java for the Hadoop framework. A Hadoop cluster has nominally a single namenode plus a cluster of datanodes, where each datanode serves up blocks of data over the network using a block protocol specific to HDFS.

HDFS stores large files across multiple machines. It achieves reliability by replicating the data across multiple hosts. Typically, data is stored on three nodes: two on the same rack, and one on a different rack. Data nodes can talk to each other to rebalance data, to move copies around, and to keep the replication of data high.

Hadoop has advantages over traditional database management systems, especially the ability to handle both structured data like that found in relational databases, as well as unstructured information.

Current tools do not provide the ability to effectively query Hadoop files. Moreover, there is no mechanism that enables user to easily view and analyze the data from such unstructured data sources.

These and other drawbacks exist.

SUMMARY OF THE INVENTION

According to one embodiment, the invention relates to a query tool for accessing data from an unstructured data source. The query tool comprises a data input that interfaces with a plurality of unstructured data sources; an interactive user interface that receives one or more user inputs; a computer server comprising at least one processor, coupled to the data input and the interactive user interface, the processor configured to: read data from one or more unstructured data sources; initiate one or more registration processes that identifies a file layout for the data; generate a table structure, using the file layout; receive a query request, via the interactive user interface; graphically represent the query request in a graph to facilitate data access; automatically process the query request based on the graph to generate a query result based on the table structure; and transmit the query result to the interactive user interface.

The system may include a specially programmed computer system comprising one or more computer processors, mobile devices, electronic storage devices, and networks.

The invention also relates to computer implemented method that implements a query tool for accessing data from an unstructured data source. The method comprises the steps of: reading, via a data input, data from one or more unstructured data sources; initiating, via a computer server comprising at least one processor, one or more registration processes that identifies a file layout for the data; generating, via the computer server, a table structure, using the file layout; receiving a query request, via the interactive user interface; graphically representing the query request in a graph to facilitate data access; automatically processing, via the computer server, the query request based on the graph interface to generate a query result based on the table structure; and transmitting the query result to the interactive user interface.

The computer implemented system, method and medium described herein provide unique advantages to entities that process massive amounts of data from various sources, including unstructured data sources. With a single query, a user can retrieve data from any combination of sources, join data from any source with any other, and/or migrate and store data into new sources, e.g., database tables, flat files, files in an HDFS, etc. Users may also save the generated applications for later repeated execution as well as for batch translation of particular queries. The innovative query tool further enables more thorough decision making for entities and businesses. Other advantages include improvements in efficiency, speed and user experience. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
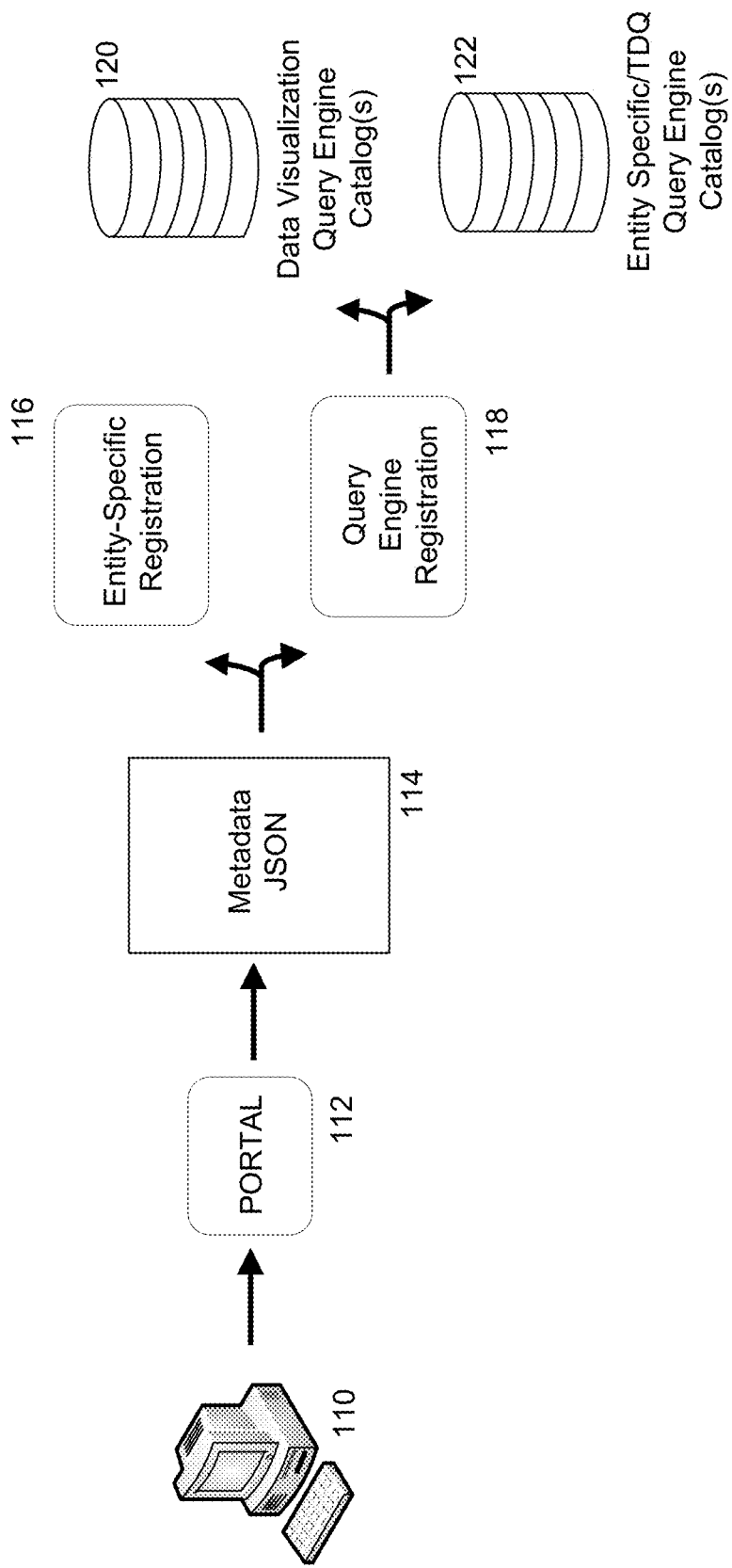
FIG. 1 is an exemplary diagram of a registration architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an innovative query tool that reads, parses and catalogs reference data from unstructured files, such as Hadoop files. For example, an embodiment of the present invention may read data from Hadoop Distributed File System (HDFS) (or other un-structured data source) via a data connection, such as an Open Database Connectivity (ODBC) connection, and make the data available for analysis, reporting and other actions. ODBC represents a standard application programming interface (API) for accessing database management systems (DBMS).

An embodiment of present invention may integrate query engines. According to an exemplary embodiment, the query tool may integrate Query>It, a scalable query engine that federates data from any structured or semi-structured data source. These sources may include relational databases and non-relational data stores, including flat files and files in a Hadoop Distributed File System (HDFS), for example. Query>It is targeted at entities and organizations that need flexible, secure, and cost-effective querying of multiple data sources. Data does not have to be moved or modified. Data is registered by describing its record format and any keys and indices. The resulting data source may then be virtualized as a table in a database. Other query engines may be implemented in accordance with the various embodiments of the present invention.

The data sources may be federated in a single integrated relational view. With a single query, a user can retrieve data from any combination of sources, join data from any source with any other, and/or migrate and store data into new sources, e.g., database tables, flat files, files in an HDFS, etc. Users may also save the generated applications for later repeated execution as well as for batch translation of particular queries.

An embodiment of the present invention extends a registration process to send a copy of Data Services (DS) metadata JSONs to an Extract Transform and Load (ETL) process which performs auto-registration of DS registered metadata in catalogs, such as a query engine catalogs. JSON represents JavaScript Object Notation which is an open-standard file format that uses human-readable text to transmit data objects comprising attribute-value pairs and array data types. JSON is a common data format used for asynchronous browser/server communication. For example, DS metadata JSONs may be collected in batches and processed in predetermined intervals, e.g., every 2 minutes, etc. DS metadata JSONs may describe the structure of the files. Both query engine catalogs, one that is entity-specific unstructured data in Hadoop and technical data quality (TDQ) and another catalog for a data visualization tool (such as QlikView), may be imported simultaneously. As soon as the catalog import process is complete, end users may then query data in HDFS via a ODBC connection. For example, the data may be read from HDFS via a query engine using an ETL component "Read Query".

FIG. 1 is an exemplary diagram of a registration architecture, according to an embodiment of the present invention. A user may access a portal 112 via a user device 110, such as a computer, mobile device, etc. A Registration process may import metadata, represented by 114, for registered datasets into one or more catalogs, including a data visualization tool query engine catalog, an entity specific catalog and TDQ query engine catalog. The registration process, represented by 116 and 118 may create corresponding metadata in catalogs, illustrated by 120, 122. For example, metadata may include schemas, data sources, grants of use permission; grants of select permissions, etc.

Schemas may include Data Domains. For example, if a Data Domain is on a branch, schema name may be computed as <Branch name>_DataDomain_<Domain name>. Data Sources may include Datasets. Also, the system may grant USE permission on Schemas to role "qi_odbc_access." The system may grant SELECT permission on Data Sources to role "qi_odbc_access."

Figure 2:
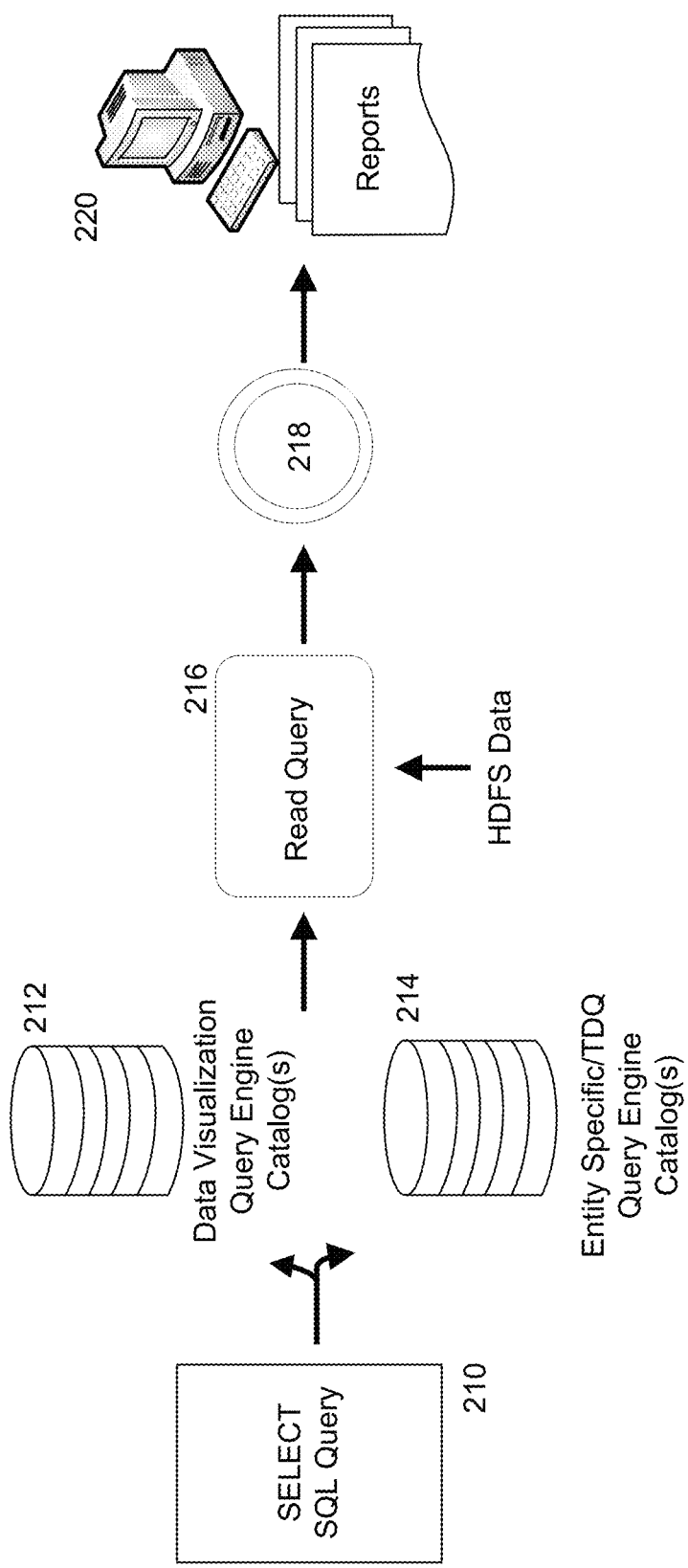
FIG. 2 is an exemplary diagram of a registration architecture, according to an embodiment of the present invention.

FIG. 2 is an exemplary diagram of a registration architecture, according to an embodiment of the present invention. When a DS registration is changed, registration may be updated automatically. In this example, an input, Select SQL query, may be represented at 210, with access to catalogs, represented by 212 and 214, for updating registration. A Read Query component 216 may read data from HDFS (or other source of unstructured data) and via a ODBC connection, and make data available to a data visualization tool, represented by 218, for reporting purposes, via device 220.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 3:
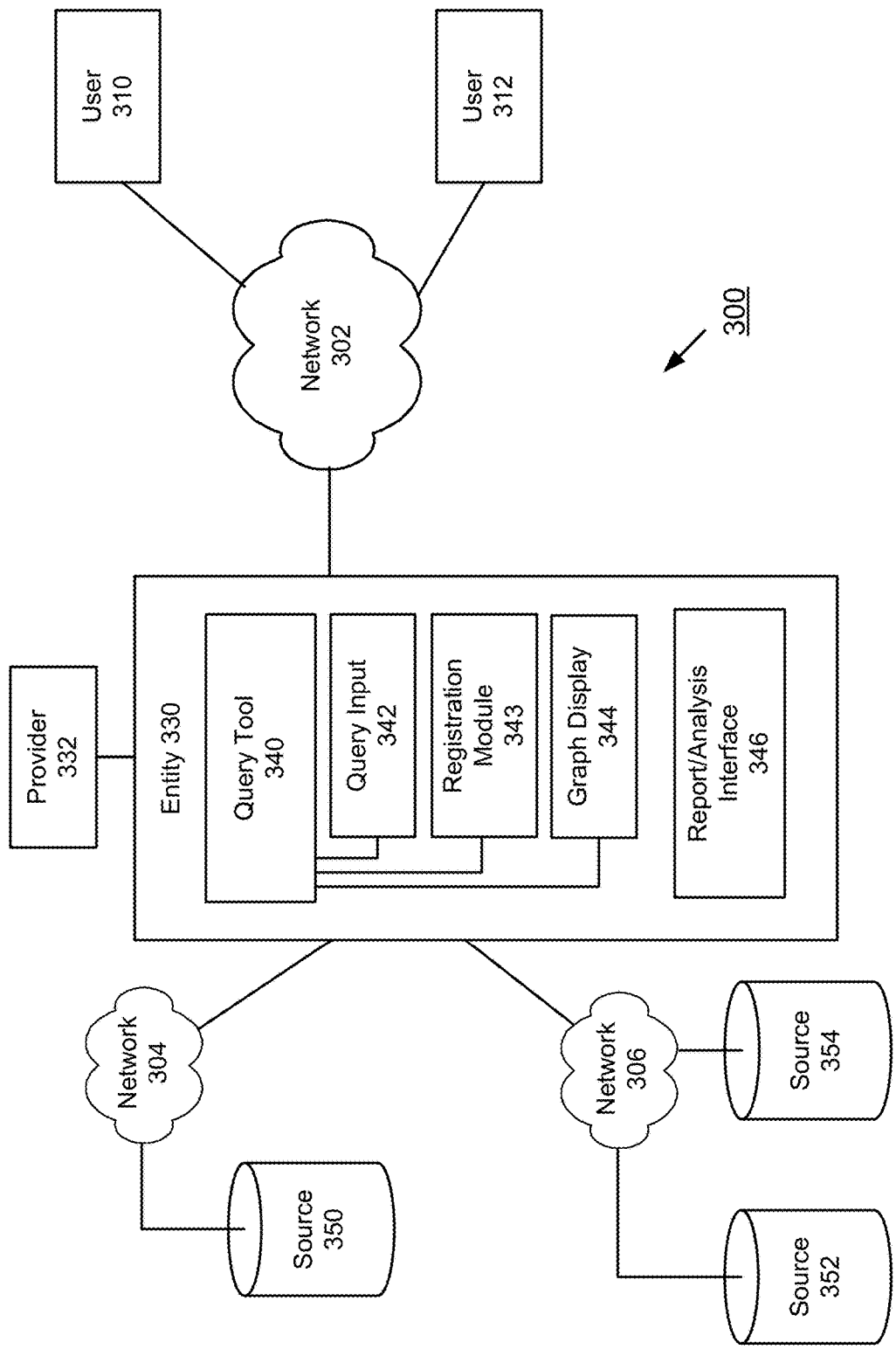
FIG. 3 is an exemplary diagram of a system that implements a query tool, according to an embodiment of the present invention.

FIG. 3 is an exemplary diagram of a system that implements a query tool, according to an embodiment of the present invention. As illustrated, Network 302 may be communicatively coupled with various users and systems, represented by 310, 312. For example, user may represent an entity seeking to query and analyze data, including unstructured data, from various sources, represented by Source 350, 352 and 354. In addition, Network 302 communicates with Entity 330 that manages various types of data and analysis. For example, Entity 330 may provide payment related services and/or other features and therefore have a need to process, access and/or analyze massive amounts of data.

Entity 330 may include a Query Tool 340 that includes Query Input 342, Registration Module 343 and Graph Display 344. The query tool of an embodiment of the present invention reads files from various data sources. A query may be received via Query Input 342. For example, the query tool may access data from any file format, including unstructured data on Hadoop, for example. A registration process, via Registration Module 343, may define the file layout for the data. The file layout information may then be used to create a table-like structure (e.g., columns within a table) where the query output may be displayed in the table-like structure. For example, the query tool may use the structure of the file that includes field name and datatype as column name and datatype in a table structure and display in a column output structure. In addition, the query tool may develop a graph, via Graph Display 344, to facilitate the process of reading data from Hadoop and then display the data on an interactive user interface.

An embodiment of the present invention is directed to connecting a query tool to an unstructured file source and then retrieve or load the data from Hadoop, or other data source. An embodiment of the present invention may also retrieve data from multiple disparate sources and join or concatenate the data for analytics and processing. This feature will enable more thorough decision making for entities and businesses. The innovative query tool then displays the data on an interactive user interface, such as 346. The displayed data may be in various formats, including custom record formats. Report/Analytics Interface 346 may generate analytics, reports, trends and/or other data, etc. The query tool analysis and processing described herein may be provided by Entity 330 and/or a third party provider, represented by 332, where Provider 332 may operate with Financial Entity 330, for example.

Query Tool 340 may access local as well as remote sources of data, including Sources 350, 352 and 354, via networks 304 and 306.

The system 300 of FIG. 3 may be implemented in a variety of ways. Architecture within system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 are depicted, it should be appreciated that other connections and relationships are possible. The system 300 described below may be used to implement the various methods herein, by way of example. Various elements of the system 300 may be referenced in explaining the exemplary methods described herein.

Network 302 may be a wireless network, a wired network or any combination of wireless network and wired network. For example, Network 302 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. Network 302 may further include one, or any number of the exemplary types of networks mentioned above operating as a stand-alone network or in cooperation with each other. Network 302 may utilize one or more protocols of one or more network elements to which it is communicatively coupled. Network 302 may translate to or from other protocols to one or more protocols of network devices. Although Network 302 is depicted as one network for simplicity, it should be appreciated that according to one or more embodiments, Network 302 may comprise a plurality of interconnected networks, such as, for example, a service provider network, the Internet, a cellular network, corporate networks, or even home networks, or any of the types of networks mentioned above.

Data may be transmitted and received via Network 302 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 3 illustrates individual devices or components, it should be appreciated that there may be several of such devices to carry out the various exemplary embodiments. Entity 330 may communicate with various entities, via Interface 344, 346, using any mobile or computing device, such as a laptop computer, a personal digital assistant, a smartphone, a smartwatch, smart glasses, other wearables or other computing devices capable of sending or receiving network signals. Interface 344, 346 may represent a user interface and/or other interactive communication portal.

Entity 330 may be communicatively coupled to Sources 350, 352, 354. Sources 350, 352, 354 may include any suitable data structure to maintain the information and allow access and retrieval of the information. For example, Sources 350, 352, 354 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Sources 350, 352, 354 may be any suitable storage device or devices. The storage may be local, remote, or a combination thereof with respect to Sources 350, 352, 354. Sources 350, 352, 354 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Sources 350, 352, 354 may have back-up capability built-in. Communications with Sources 350, 352, 354 may be over a network, or communications may involve a direct connection between Sources 350, 352, 354 and Entity 330, as depicted in FIG. 3. Sources 350, 352, 354 may also represent cloud or other network based storage.

Figure 4:
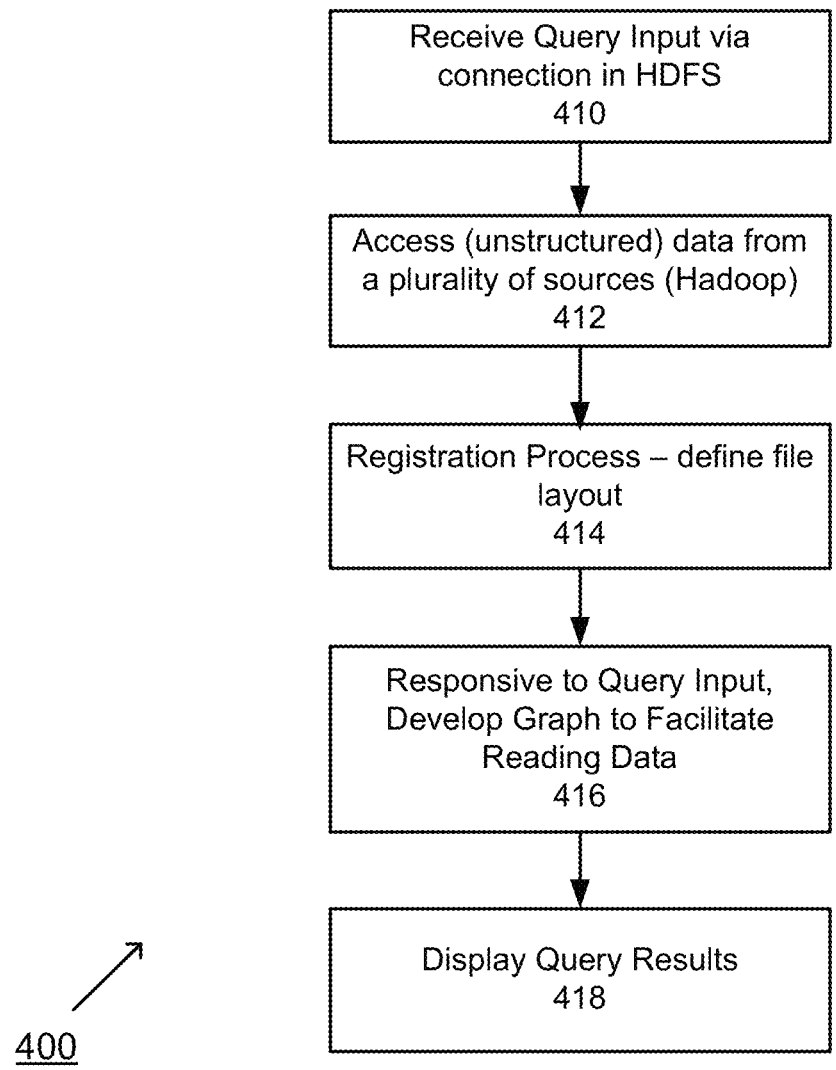
FIG. 4 is an exemplary flowchart illustrating a registration process, according to an embodiment of the present invention.

FIG. 4 is an exemplary flowchart illustrating a registration process, according to an embodiment of the present invention. At step 410, a query tool may receive a query input via a connection in HDFS. At step 412, the query tool may access data, such as unstructured data, from a plurality of sources, including Hadoop. At step 414, the query tool may initiate a registration process. The registration process may define file layout and other formatting specifics. At step 416, responsive to the query input, the query tool may develop a graph to facilitate reading data. At step 418, the query tool may display query results. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

Figure 5:
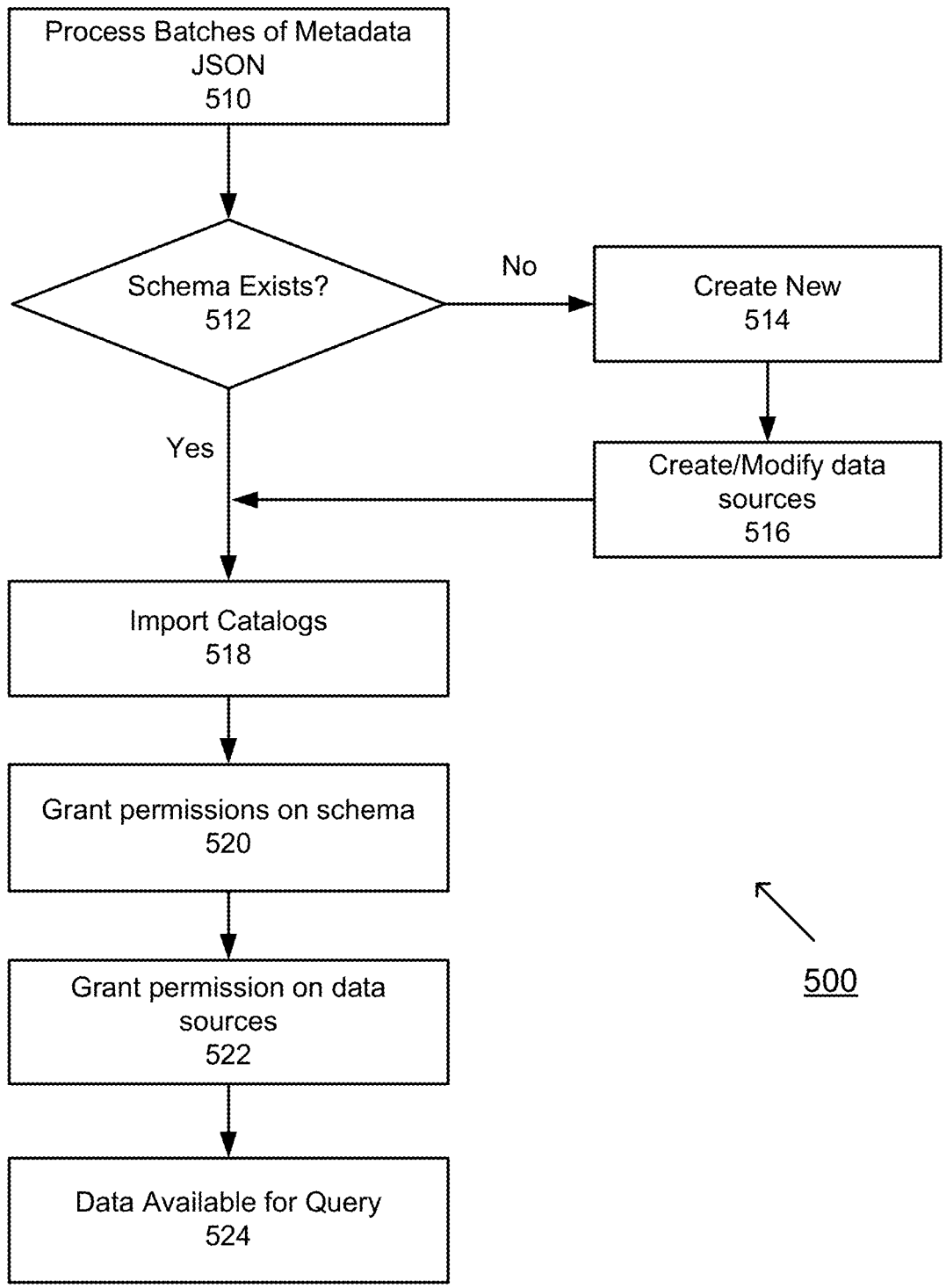
FIG. 5 is an exemplary flowchart illustrating a registration process, according to an embodiment of the present invention.

FIG. 5 is an exemplary flowchart illustrating a registration process, according to an embodiment of the present invention. At step 510, a query tool may process batches of Metadata JSON. This may occur at a predetermined internal, e.g., every 2 minutes. At step 512, the query tool may determine whether a schema exists. If one does not exist, the query tool may create a new schema, at step 514. At step 516, the query tool may create and/or modify data sources. If a schema does exist, the query tool may import or update catalogs, at step 518. This may include updating catalogs, such as query engine catalogs, entity specific catalogs and TDQ catalogs, etc. At step 520, the query tool may grant permissions on schema. At step 522, the query tool may grant permissions on data sources. At step 524, a ready query component may make data stored in HDFS available to end users via a connection, such as ODBC connection. The query tool may read data from HDFS and present it in various formats, including a custom record format.

Also, for good records in catalogs, DS conformed or semantic record format and a specific index column (e.g., entity_date_partition index column) may be implemented. For bad records, row GUID and DS registration record format and a specific index column (e.g., entity_date_partition index column) may be implemented. For example, good records may include data with no quality issues whereas bad records may represent data with quality issues and therefore cannot be used for downstream processes. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

Figure 6:
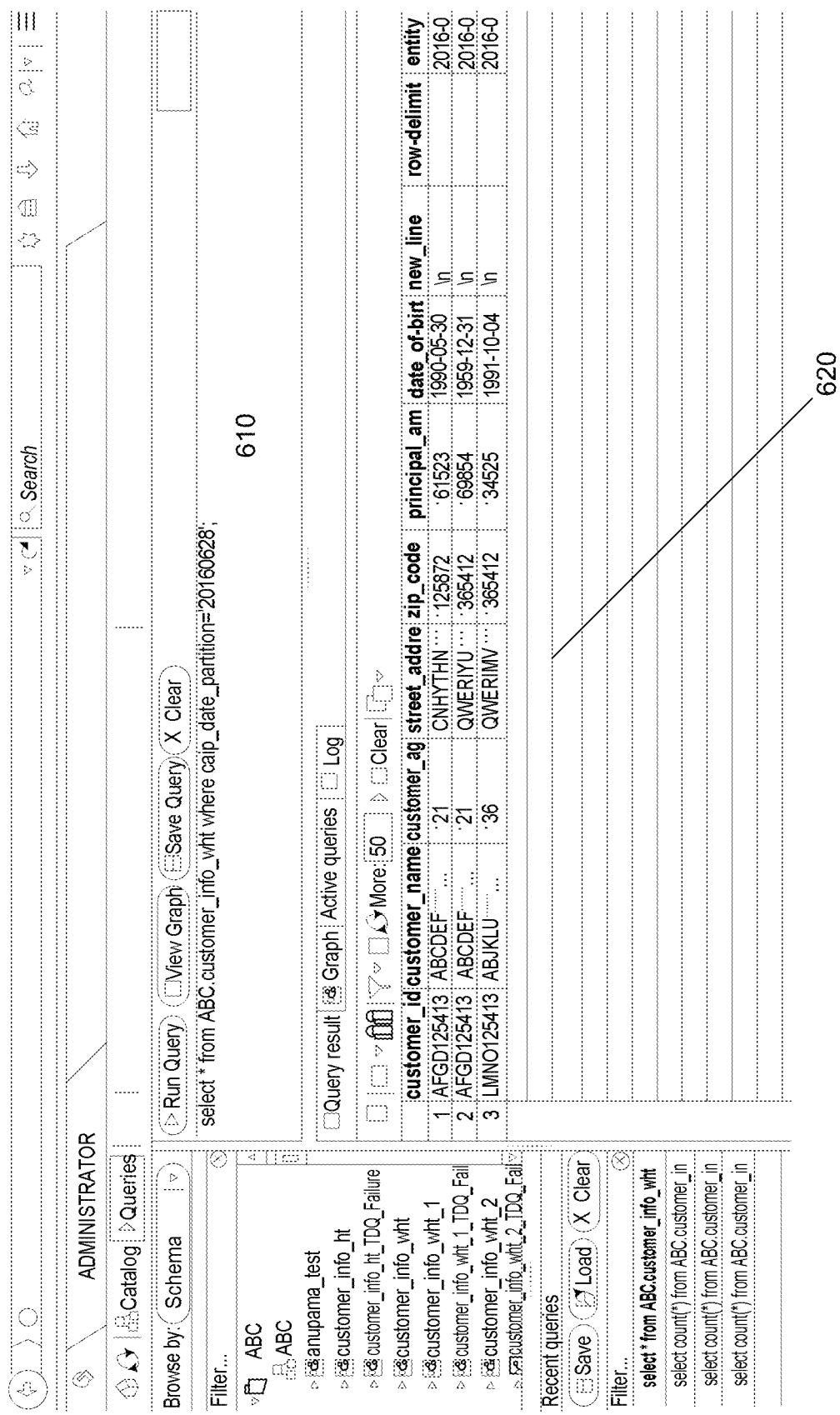
FIG. 6 is an exemplary user interface of a query tool, according to an embodiment of the present invention.

FIG. 6 is an exemplary user interface of a query tool, according to an embodiment of the present invention. FIG. 6 is an exemplary Administrator Interface that receives a query input, at 610, and provides corresponding query results, at 620. In this example, query results may include customer ID, customer name, customer_ag, street address, principle_am, date of birth, new line, row-delimit, etc. Depending on the data retrieved and the current application, the query results will vary. For example, the query tool may receive a query input that includes "from ABC customer_info_wht where entity_date_partition='20160628'" This exemplary query may indicate that the query tool retrieves data from a source system "ABC" from a specific file having a file name of "customer_info_wht" and date that matches "2016-06-28,"

Figure 7:
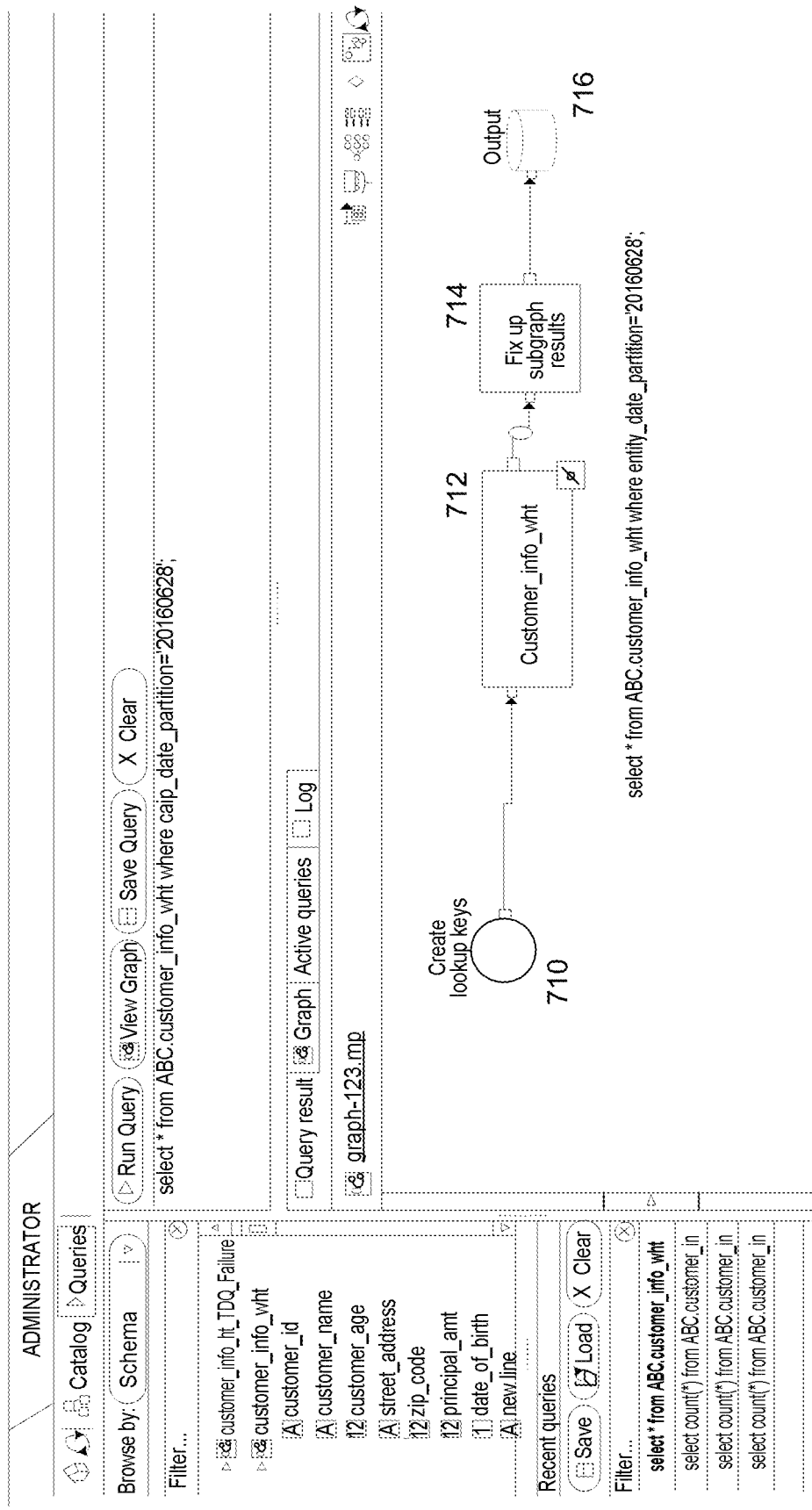
FIG. 7 is an exemplary user interface illustrating running a graph, according to an embodiment of the present invention.

FIG. 7 is an exemplary user interface illustrating running a graph, according to an embodiment of the present invention. FIG. 7 provides an illustration of the query tool running an exemplary graph. The graph may represent a relationship that directly relates data items in a data store. For example, a graph may represent individual entities and their relationships. The relationships allow data in the data store to be linked together directly, and may be represented as a single operation. Representing data sets in a graph, as opposed to traditional rows and columns, facilitates data retrieval and processing. When a user writes a SQL to retrieve rows from a file, such as a Hadoop file, the query tool may internally build a graph. The graph may in turn is used to extract data that may then be displayed to the user. In the example illustrated in FIG. 7, lookup keys may be created, as shown by 710. For example, in an application involving a financial institution, customer information may be processed and subgraph results may then be updated, as shown by 712 and 714. The output, represented by 716, may be provided on an interactive user interface. FIG. 7 illustrates a graph that may be generated dynamically based on a user's input.

Figure 8:
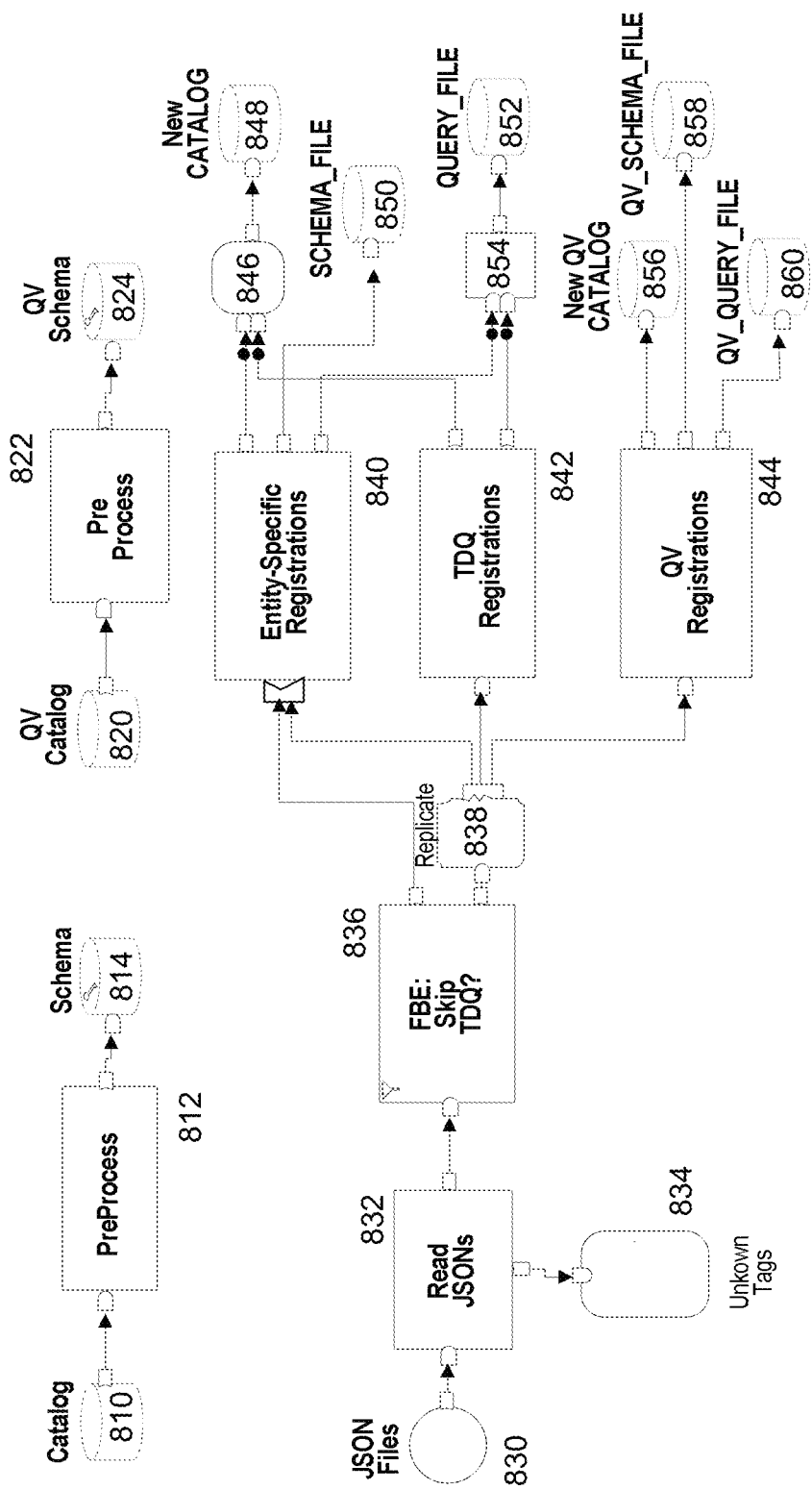
FIG. 8 is an exemplary illustration of a graph, according to an embodiment of the present invention.

FIG. 8 is an exemplary illustration of a graph, according to an embodiment of the present invention. In this example, FIG. 8 demonstrates adding a file and its associated column. Catalog data 810 may be preprocessed, via 812, into schemas 814. Likewise, QlikView (QV) catalog data 820 may be preprocessed, via 822, into QV schemas 824. QlikView represents an exemplary data visualization tool. Other visualization tools may be implemented. JavaScript Object Notation (JSON) files 830 may be accessed and then registrations may be initiated, at 832 where unknown tags may be removed at 834. JSON represents an open-standard format that uses human-readable text to transmit data objects consisting of attribute-value pairs. In this example, entity-specific registrations, technical data quality (TDQ) registrations and QV registrations may be performed where data may be concatenated and stored in catalogs, schema files, etc. Other registrations may be implemented in other embodiments and applications.

The registration process may create new schemas if they do not exist; create or modify data sources; import catalog data; grant various permissions on a scheme and/or data source.

According to an exemplary illustration, a graph may have at least two phases. The first phase may read schemas from the most recent catalog and create a schema lookup file, one for the schemas in entity-specific catalog and TDQ catalog and another for the schemas in another catalog schema, in this example QV schema. The first phase may also read and parse metadata JSON files, as represented by 832.

The second phase may check a "SKIP TDQ Check" flag to determine if TDQ has been enabled on a dataset, at 836. In this example, FBE may represent filter records using the where clause. If so, the second phase may then generate metadata for entity-specific/TDQ and other catalogs. Otherwise, the second phase may generate metadata for the entity-specific/TDQ catalog only. Functions may be performed, including replicate 838 and concatenate 846 and 854.

As part of the exemplary entity-specific registrations 840, the system may perform various actions, including create a schema if one does not exist; create or modify a data source for good records; create a GRANT statement to give USE permissions on a schema; and create a GRANT statement to give SELECT permission on a data source for good records. For example, a concatenate function may be performed at 846 with access to Catalog 848 and Schema File 850.

As part of the exemplary TDQ registrations 842, the system may perform various actions, including create or modify a data source for bad records; and create a GRANT statement to give SELECT permission on data source for bad records. For example, a concatenate function may be performed at 854 with access to Query File 852.

As part of the exemplary QV registrations 844, the system may perform various actions, including create a schema if one does not exist; create or modify a data source for bad records; create a GRANT statement to give USE permissions on a schema; and create a GRANT statement to give SELECT permission on a data source for bad records. Other registrations and variations may be realized and implemented. QV registrations 844 may access Catalog 856, Schema File 858 and Query File 860.

According to an exemplary illustration, a graph may produce various outputs including: new catalog for entity-specific/TDQ query engine; new catalog for QlikView query engine; a file containing a list of new schemas to be created in entity-specific/TDQ catalog; a file containing a list of new schemas to be created in QlikView (QV) catalog; a file containing a list of GRANT statements to be executed on an entity-specific/TDQ catalog and a file containing a list of GRANT statements to be executed on QV catalog. Other variations on the output may be realized and implemented.

Figure 9:
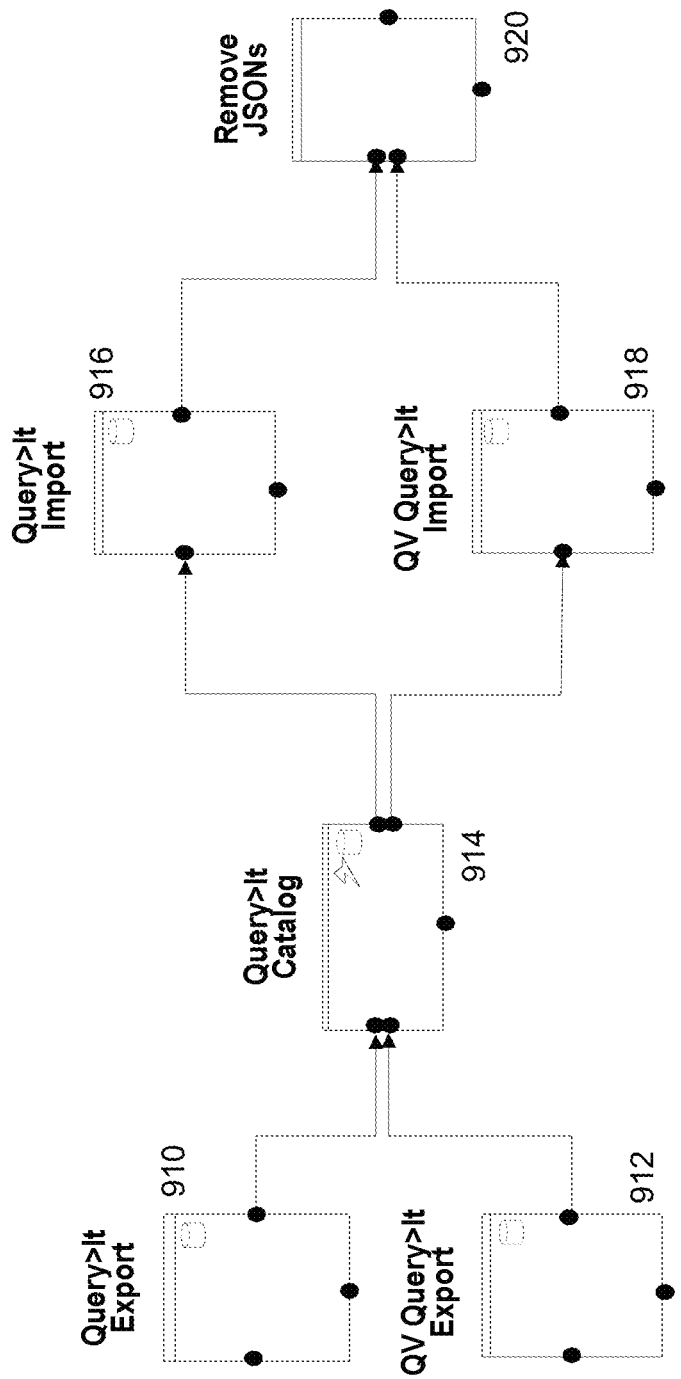
FIG. 9 is an exemplary illustration of a plan that exports catalogs, according to an embodiment of the present invention.

FIG. 9 is an exemplary illustration of a plan that exports catalogs, according to an embodiment of the present invention. As shown in FIG. 9, catalogs may be exported during a registration process, e.g., Hadoop registration. Data may be exported, as shown by 910, 912, cataloged, as shown by 914, and then imported at 916, 918. For example, the export program tasks may run simultaneously and may be used to export registered schema into a catalog file. A graph task may perform various functions including parsing metadata JSON files; determining if a data domain has already been registered as a Schema; assembling the required information for each data source to be created and/or modified; assembling a list of schemas to be created and assembling a list of GRANT statements to grant appropriate permissions on schemas and data sources. For example, JSONs may be removed, at 920. FIG. 9 illustrates a particular query engine, however other query engines may be implemented in accordance with the various embodiments of the present invention.

Figure 10:
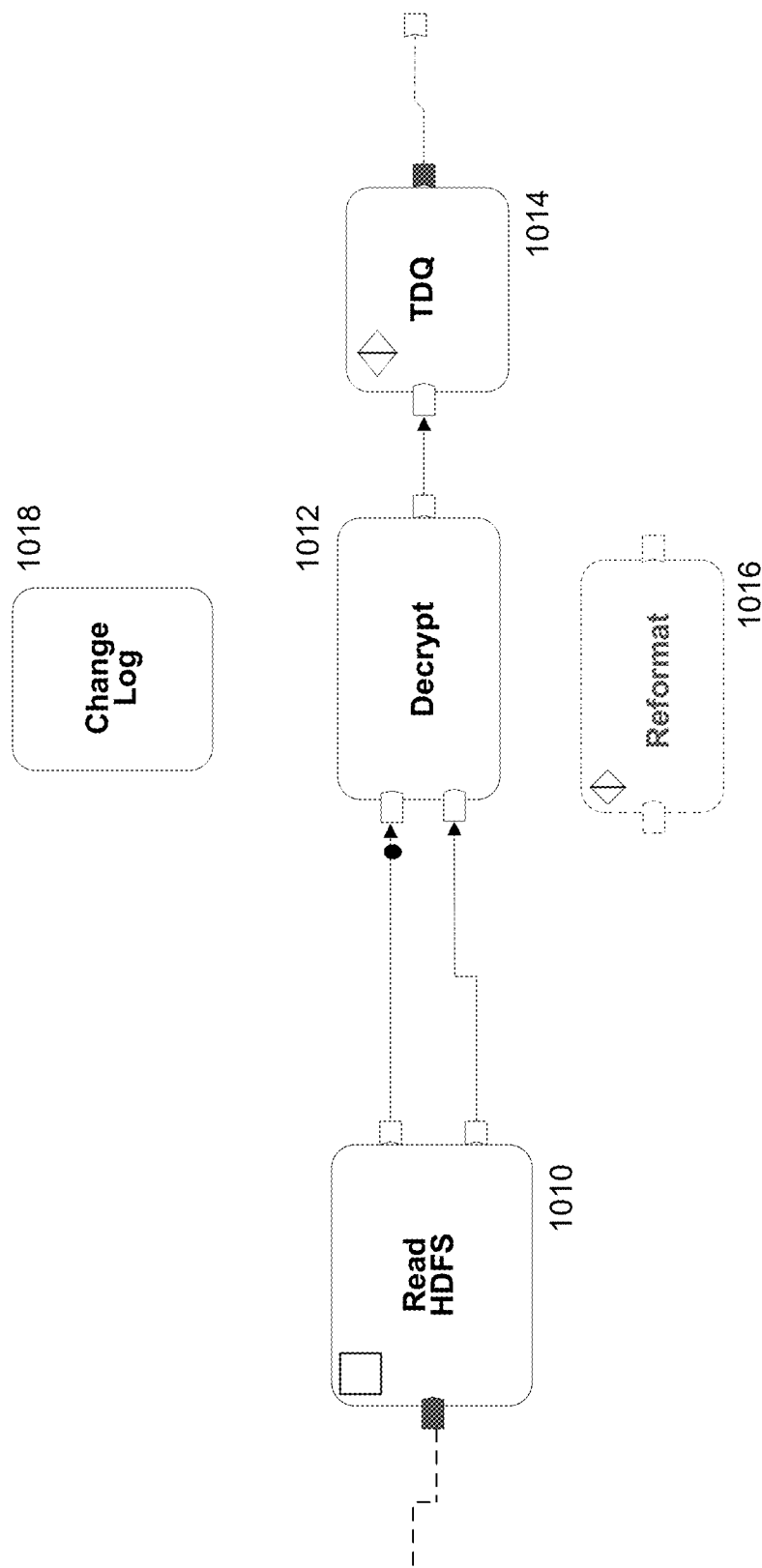
FIG. 10 is an exemplary illustration of a graph that enables a query engine to read data from Hadoop, according to an embodiment of the present invention.

FIG. 10 is an exemplary illustration of a graph that reads data from Hadoop, according to an embodiment of the present invention. FIG. 10 illustrates a process where HDFS is read at 1010, decrypted at 1012 and then forwarded to TDQ at 1014. The data may also be reformatted and modified at 1016, as needed. A record of changes may be maintained as illustrated by 1018. An embodiment of the present invention may build a graph, as illustrated in FIG. 7, dynamically to query data when a user executes a SQL input, as illustrated in FIG. 6.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in various databases and data stores. For example, the database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A query tool for accessing data from an unstructured data source comprising:
   a data input that interfaces with a plurality of unstructured Hadoop file data sources;
   an interactive user interface that receives one or more user inputs;
   a computer server comprising at least one processor, coupled to the data input and the interactive user interface, the processor configured to:
   read data from one or more unstructured Hadoop file data sources;
   initiate one or more registration processes, where each of the one or more registration processes includes:
      processing metadata JavaScript Object Notation (JSON) to identify a file layout for the data;
      determining whether a schema exists, and creating a new schema when it is determined that the schema does not exist;
      updating one or more catalogs including query engine catalogs, entity specific catalogs, and technical data quality (TDQ) catalogs;
      granting permissions on the schema and the one or more unstructured Hadoop file data sources; and
      generating a table structure, using the file layout;
   receive a query request, via the interactive user interface;
   graphically represent the query request in a graph including visual representations of a plurality of individual entities in the one or more unstructured Hadoop file data sources and one or more relationships between the plurality of individual entities to facilitate data access;
   automatically process the query request based on the graph to generate a query result based on the table structure; and
   transmit the query result to the interactive user interface.

2. The computer implemented system of claim 1, wherein the one or more unstructured data sources comprises a Hadoop distributed file system.

3. The computer implemented system of claim 1, wherein the computer server communicates with the one or more unstructured data sources via an open database connectivity connection.

4. The computer implemented system of claim 1, wherein automatically processing the query request further comprises concatenating data from multiple sources.

5. The computer implemented system of claim 1, wherein the registration process comprises identifying one or more keys and indices associated with the data.

6. The computer implemented system of claim 1, wherein the registration process comprises granting permissions on schema.

7. The computer implemented system of claim 1, wherein the registration process comprises granting permissions on one or more data sources.

8. The computer implemented system of claim 1, wherein the registration process comprises updating one or more catalogs.

9. The computer implemented system of claim 1, wherein the registration process comprises importing metadata for registered datasets into one or more catalogs.

10. The computer implemented system of claim 1, wherein the interactive user interface comprises a data visualization tool.

11. A computer implemented method that implements a query tool for accessing data from an unstructured data source, the method comprising the steps of:
- reading, via a data input, data from one or more unstructured Hadoop file data sources;
- initiating, via a computer server comprising at least one processor, one or more registration processes, where each of the one or more registration processes includes:
  - processing metadata JavaScript Object Notation (JSON) to identify a file layout for the data;
  - determining whether a schema exists, and creating a new schema when it is determined that the schema does not exist;
  - updating one or more catalogs including query engine catalogs, entity specific catalogs, and technical data quality (TDQ) catalogs;
  - granting permissions on the schema and the one or more unstructured Hadoop file data sources; and
  - generating, via the computer server, a table structure, using the file layout;
- receiving a query request, via the interactive user interface;
- graphically representing the query request in a graph including visual representations of a plurality of individual entities in the one or more unstructured Hadoop file data sources and one or more relationships between the plurality of individual entities to facilitate data access;
- automatically processing, via the computer server, the query request based on the graph to generate a query result based on the table structure; and
- transmitting the query result to the interactive user interface.

12. The computer implemented method of claim 11, wherein the one or more unstructured data sources comprises a Hadoop distributed file system.

13. The computer implemented method of claim 11, wherein the computer server communicates with the one or more unstructured data sources via an open database connectivity connection.

14. The computer implemented method of claim 11, wherein automatically processing the query request further comprises concatenating data from multiple sources.

15. The computer implemented method of claim 11, wherein the registration process comprises identifying one or more keys and indices associated with the data.

16. The computer implemented method of claim 11, wherein the registration process comprises granting permissions on schema.

17. The computer implemented method of claim 11, wherein the registration process comprises granting permissions on one or more data sources.

18. The computer implemented method of claim 11, wherein the registration process comprises updating one or more catalogs.

19. The computer implemented method of claim 11, wherein the registration process comprises importing metadata for registered datasets into one or more catalogs.

20. The computer implemented method of claim 11, wherein the interactive user interface comprises a data visualization tool.

* * * * *